US012060982B2

United States Patent
Zhang et al.

(10) Patent No.: US 12,060,982 B2
(45) Date of Patent: Aug. 13, 2024

(54) MULTICOLOR LASER SOURCE WITH LIGHT MIXING MODULE

(71) Applicant: QISDA CORPORATION, Taoyuan (TW)

(72) Inventors: Jia-Ming Zhang, Taichung (TW); Ching-Tze Huang, Taoyuan (TW); Tsung-Hsun Wu, Taoyuan (TW)

(73) Assignee: QISDA CORPORATION, Taoyuan (TW)

( * ) Notice: Subject to any disclaimer, the term of this patent is extended or adjusted under 35 U.S.C. 154(b) by 0 days.

(21) Appl. No.: 18/368,549

(22) Filed: Sep. 14, 2023

(65) Prior Publication Data

US 2024/0133538 A1 Apr. 25, 2024
US 2024/0230062 A9 Jul. 11, 2024

(30) Foreign Application Priority Data

Oct. 19, 2022 (CN) .......................... 202211280382.9

(51) Int. Cl.
*F21V 13/04* (2006.01)
*F21V 5/00* (2018.01)
*F21Y 113/10* (2016.01)

(52) U.S. Cl.
CPC .............. *F21V 13/04* (2013.01); *F21V 5/007* (2013.01); *F21Y 2113/10* (2016.08)

(58) Field of Classification Search
CPC ...... F21V 5/007; F21V 13/04; F21Y 2113/10; F21Y 2115/30; F21Y 2105/10; F21Y 2113/13
See application file for complete search history.

(56) References Cited

U.S. PATENT DOCUMENTS

| 5,990,983 | A * | 11/1999 | Hargis ................. H04N 9/3132 348/E9.026 |
| 7,898,665 | B2 * | 3/2011 | Brukilacchio .......... F21V 13/04 356/417 |
| 10,527,236 | B2 * | 1/2020 | Daniels ..................... F21V 7/04 |
| 2008/0192501 | A1 * | 8/2008 | Bartlett ................ H04N 9/3129 348/E9.026 |
| 2010/0020291 | A1 * | 1/2010 | Kasazumi .............. G03B 21/14 353/38 |

(Continued)

OTHER PUBLICATIONS

Zhang, the specification, including the claims, and drawings in the U.S. Appl. No. 18/211,298, filed Jun. 19, 2019.

*Primary Examiner* — Ismael Negron
(74) *Attorney, Agent, or Firm* — Winston Hsu (57) ABSTRACT

A multicolor laser source includes a collimator lens having first and second lens portions, a first laser unit for emitting light of a first color, a second laser unit for emitting light of a second color, a reflective unit disposed obliquely to a light-entrance axis of the first lens portion, a reflective diffusing member, and a lens array disposed on a light-exit axis of the second lens portion. The reflective unit is disposed opposite to the first and second laser units for reflecting the first and second color lights to the first lens portion along the light-entrance axis. The reflective diffusing member is disposed at a side of the collimator lens to homogenize the first and second laser lights and reflect the first and second color lights to the second lens portion along the first light-exit axis, to be outputted through the lens array.

19 Claims, 4 Drawing Sheets

(56) References Cited

U.S. PATENT DOCUMENTS

2013/0170007 A1* 7/2013 Kurashige ............ G02B 26/101
  359/24
2024/0069421 A1* 2/2024 Zhang .................. G03B 21/208
2024/0073381 A1* 2/2024 Zhang ................... H04N 9/317

* cited by examiner

MULTICOLOR LASER SOURCE WITH LIGHT MIXING MODULE

BACKGROUND OF THE INVENTION

1. Field of the Invention

The present invention relates to a multicolor light mixing module, and more specifically, to a multicolor light mixing module utilizing a reflective diffusing member for diffusing and homogenizing a first color light and a second color light and utilizing a lens array for mixing the first color light and the second color light.

2. Description of the Prior Art

In general, a conventional laser projection apparatus adopts a light mixing module to provide a multicolor laser beam for subsequent image projection. In the practical application, for further reducing an overall volume of a laser source of the laser projection apparatus, the common design involves packaging red, green, and blue laser diodes in a side-by-side arrangement into one multicolor laser source module, so as to simultaneously provide red, green and blue color lights to the light mixing module of the laser projection apparatus.

However, since the aforesaid packaging design only arranges the red, green, and blue laser diodes in multiple rows sequentially (e.g., arranging a plurality of red laser diodes in a row and arranging a plurality of green and blue laser diodes in another row), it may cause an uneven color distribution problem on an image projected by the laser projection apparatus (e.g., the image having a greenish upper portion and a bluish lower portion). Furthermore, the laser speckle problem may also occur due to high coherence of the laser beam. The aforesaid problems reduce the image projection quality of the laser projection apparatus.

SUMMARY OF THE INVENTION

The present invention provides a multicolor light mixing module suitable for providing a multicolor laser beam to a laser projection apparatus. The multicolor light mixing module includes a laser source set, at least one collimator lens, a reflective unit, a reflective diffusing member, and a lens array. The laser source set includes a plurality of first lighting units and a plurality of second lighting units arranged sequentially. The plurality of first lighting units emits a first color light, and the plurality of second lighting units emits a second color light. The at least one collimator lens is disposed on a light-entrance axis and has a first lens portion and a second lens portion. The reflective unit is obliquely disposed on the light-entrance axis and opposite to the plurality of first lighting units and the plurality of second lighting units for reflecting the first color light and the second color light to the first lens portion along the light-entrance axis. The reflective diffusing member is disposed at a side of the at least one collimator lens to homogenize the first color light and the second color light transmitted from the first lens portion and reflect the first color light and the second color light to the second lens portion for guiding the first color light and the second color light to travel along a first light-exit axis. The lens array is disposed corresponding to at least one of the first lens portion and the second lens portion for mixing the first color light and the second color light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
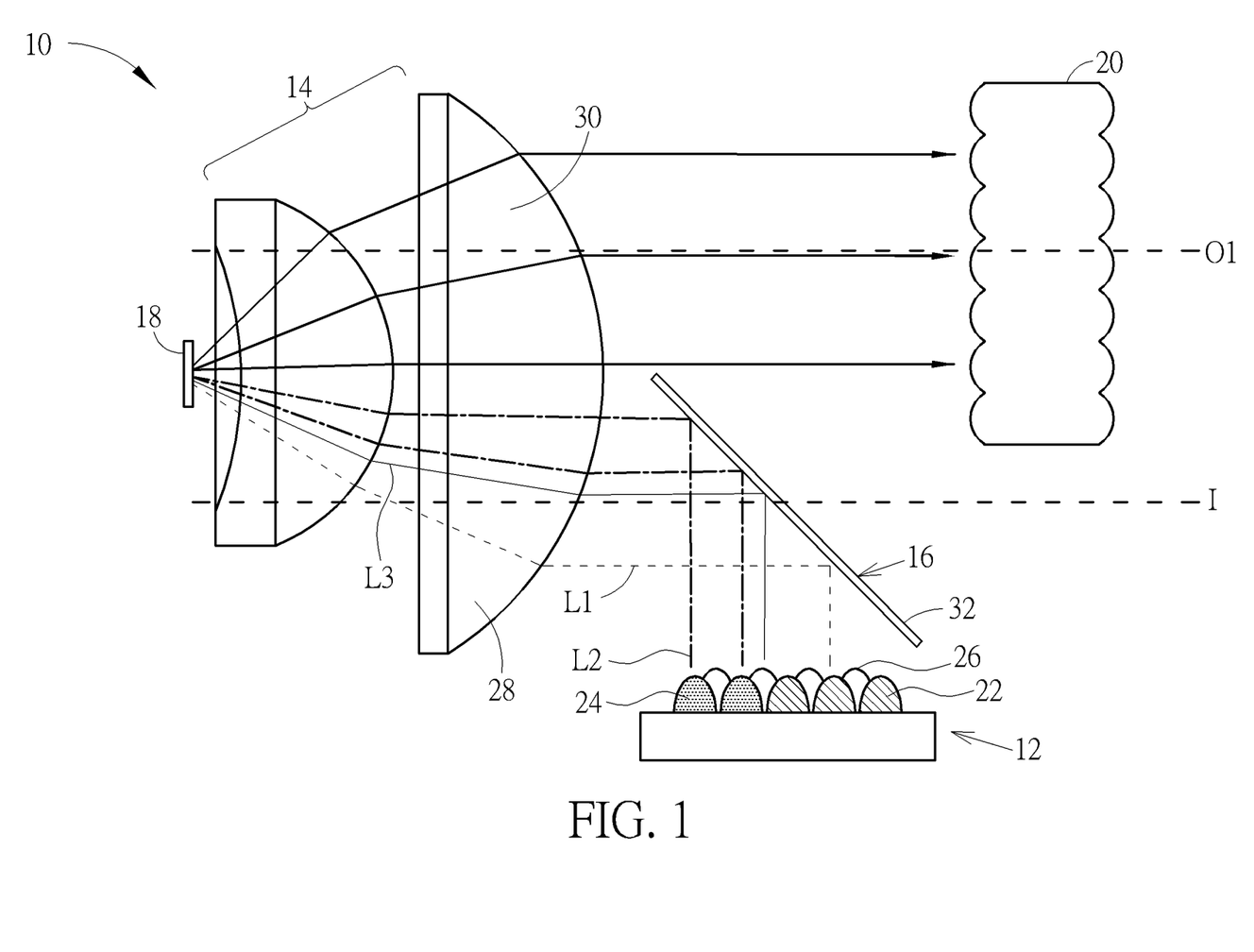
FIG. 1 is a side view of a multicolor light mixing module according to an embodiment of the present invention.

Please refer to FIG. 1, which is a side view of a multicolor light mixing module 10 according to an embodiment of the present invention. As shown in FIG. 1, the multicolor light mixing module 10 is suitable for providing a multicolor laser beam to a laser projection apparatus for subsequent image projection. The multicolor light mixing module 10 includes a laser source set 12, at least one collimator lens 14 (two shown in FIG. 1, but not limited thereto), a reflective unit 16, a reflective diffusing member 18, and a lens array 20.

The laser source set 12 includes a plurality of first lighting units 22 (three shown in FIG. 1, but not limited thereto) and a plurality of second lighting units 24 (two shown in FIG. 1, but not limited thereto) arranged sequentially and includes a plurality of third lighting units 26 (four shown in FIG. 1, but not limited thereto) arranged sequentially and adjacent to the plurality of first lighting units 22 and the plurality of second lighting units 24. The first lighting unit 22 could be preferably a green laser diode for emitting a first color light L1 (i.e., green light). The second lighting unit 24 could be preferably a blue laser diode for emitting a second color light L2 (i.e., blue light). The third lighting unit 26 could be preferably a red laser diode for emitting a third color light L3 (i.e., red light). The present invention is not limited to the aforesaid design, meaning that the color light configuration and the type of light source could be varied with the practical application of the multicolor light mixing module 10. Furthermore, in this embodiment, as shown in FIG. 1, the first lighting units 22 and the second lighting units 24 could be arranged in blue-blue-green-green-green order from left to right horizontally and the third lighting units 26 could be arranged in red-red-red-red order from left to right horizontally, but the present invention is not limited thereto.

The collimator lens 14 is disposed on a light-entrance axis I and has a first lens portion 28 and a second lens portion 30 for condensing the first color light L1, the second color light L2, and the third color light L3. Furthermore, in this embodiment, the reflective unit 16 could include a reflective sheet 32. The reflective sheet 32 is obliquely disposed on the light-entrance axis I (preferably, an oblique angle of the reflective sheet 32 relative to the light-entrance axis I is equal to 45°, but not limited thereto) and opposite to the first lighting unit 22, the second lighting unit 24, and the third lighting unit 26, so that the first color light L1, the second color light L2, and the third color light L3 can be reflected to the first lens portion 28 along the light-entrance axis I and then pass through the first lens portion 28 to be incident to the reflective diffusing member 18. The lens array 20 is disposed corresponding to the second lens portion 30 for mixing the first color light L1, the second color light L2, and the third color light L3 transmitted from the second lens portion 30 along a first light-exit axis O1, so as to generate the light splitting, beam shaping, and speckle mixing effects. The lens configuration and optical principle of the collimator lens 14 and the array design of the lens array 20 are not limited to FIG. 1 and could be varied with the practical application of the multicolor light mixing module 10, and the related description is omitted herein since it is commonly seen in the prior art.

Figure 2:
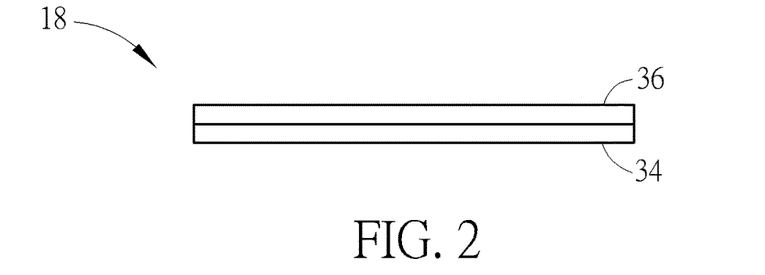
FIG. 2 is an enlarged diagram of a reflective diffusing member in FIG. 1.

Please refer FIG. 1 and FIG. 2. FIG. 2 is an enlarged diagram of the reflective diffusing member 18 in FIG. 1. As shown in FIG. 1 and FIG. 2, the reflective diffusing member 18 is disposed at a side of the collimator lens 14 for diffusing and homogenizing the energy and directivity of the first color light L1, the second color light L2, and the third color light L3 and reflecting the first color light L1, the second color light L2, and the third color light L3 to the second lens portion 30, so as to guide the first color light L1, the second color light L2, and the third color light L3 to travel along the first light-exit axis O1. To be more specific, in this embodiment, the reflective diffusing member 18 could include a reflective sheet 34 and a haze diffusing layer 36. The haze diffusing layer could be formed on the reflective sheet 34 by machining (e.g., metal bumps), or could be attached or coated on the reflective sheet 34, to allow the first color light L1, the second color light L2, and the third color light L3 to pass through the second lens portion 30 via homogenization and reflection of the reflective diffusing member 18. The reflective sheet 34 could be preferably a metal plate or a reflective mirror, and a haze of the haze diffusing layer 36 could be preferably greater than 1.5 (but not limited thereto).

Figure 3:
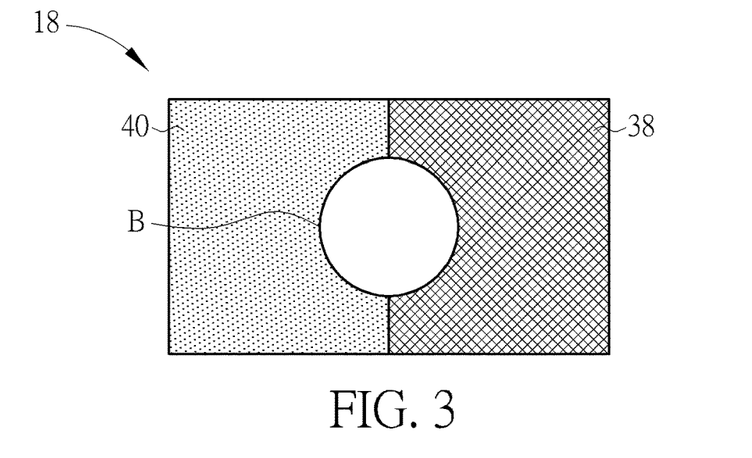
FIG. 3 is a top view of the reflective diffusing member in FIG. 2.

In practical application, for further improving the diffusing and reflecting effects of the reflective diffusing member 18 to allow the first color light L1, the second color light L2, and the third color light L3 to be incident to the collimator lens 14 at a greater diffusing angle, the reflective diffusing member 18 could adopt a haze partition design. For example, please refer to FIG. 1 and FIG. 3. FIG. 3 is a top view of the reflective diffusing member 18 in FIG. 2. As shown in FIG. 1 and FIG. 3, the haze diffusing layer 36 could include a first haze area 38 and a second haze area 40 adjacent to each other. The first haze area 38 corresponds to the first lens portion 28, and the second haze area 40 corresponds to the second lens portion 30. The haze diffusing layer 36 could adopt the design in which a haze of the first haze area 38 is different from a haze of the second haze area 40 (but not limited thereto, meaning that the present invention could adopt the design in which the haze of the first haze area 38 is equal to the haze of the second haze area 40 in another embodiment). In this embodiment, the haze of the first haze area 38 (e.g., 3.0) could be preferably higher than the haze of the second haze area 40 (e.g., 2.0), but the present invention is not limited thereto, meaning that the present invention could adopt the design in which the haze of the first haze area 38 is lower than the haze of the second haze area 40 in another embodiment. Via the aforesaid haze design, after the first color light L1, the second color light L2, and the third color light L3 pass through the first lens portion 28 to form a beam B incident to the first haze area 38 and the second haze area 40 and the beam B is diffused and reflected by the reflective diffusing member 18, the incident range of the beam B on the collimator lens 14 could be further expanded, so as to allow the first color light L1, the second color light L2, and the third color light L3 to pass through the first lens portion 28 and the second lens portion 30 simultaneously and then travel along the first light-exit axis O1.

Figure 4:
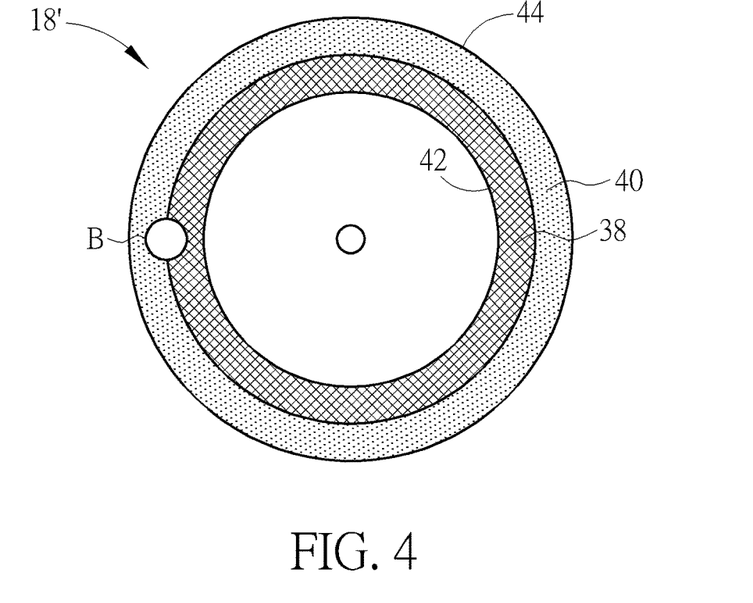
FIG. 4 is a top view of a reflective diffusing member according to another embodiment of the present invention.

In addition, the present invention could adopt the design in which the reflective diffusing member is movably disposed at a side of the collimator lens for further enhancing the diffusing and reflecting effects of the reflective diffusing member and prevent overheating of the reflective diffusing member 18. For example, the reflective diffusing member 18 as shown in FIG. 3 could move reciprocally relative to the collimator lens 14 (e.g., moving up and down along the gravity direction in FIG. 1, but not limited thereto), so as to allow the first color light L1, the second color light L2, and the third color light L3 to pass through the first lens portion 28 to be simultaneously incident to the first haze area 38 and the second haze area 40 moving relative to the collimator lens 14. In another embodiment, the haze diffusing member (e.g., a reflective diffusing member 18' as shown in FIG. 4) could be a diffusing wheel to rotate relative to the collimator lens 14, so as to allow the first color light L1, the second color light L2, and the third color light L3 to be simultaneously incident to the first haze area 38 and the second haze area 40 rotating relative to the collimator lens 14 after passing through the first lens portion 28 to form the beam B. The first haze area 38 and the second haze area 40 are formed on an inner ring portion 42 and an outer ring portion 44 of the reflective diffusing member 18', respectively, but not limited thereto, meaning that the present invention could adopt the design in which the first haze area 38 is formed on the outer ring portion 44 and the second haze area 40 is formed on the inner ring portion 42 in another embodiment.

Via the design in which the reflective diffusing member 18 is utilized to diffuse and homogenize the first color light L1, the second color light L2, and the third color light L3 for eliminating the laser speckle problem and the lens array 20 is utilized to mix the first color light L1, the second color light L2, and the third color light L3, the present invention can still provide the despeckle laser beam with multicolor light distributed in proper proportions even in the configuration that the red, green, and blue laser diodes are arranged in multiple rows sequentially (e.g., arranging a plurality of red laser diodes in a row and arranging a plurality of green and blue laser diodes in another row) aforementioned in the prior art. In such a manner, the present invention can efficiently solve the uneven color distribution problem on the image projected by the laser projection apparatus (e.g., the image having a greenish upper portion and a bluish lower portion) and the laser speckle problem aforementioned in the prior art, so as to greatly improve the image projection quality and color uniformity of the laser projection apparatus.

It should be mentioned that the reflective unit and lens array configurations adopted by the multicolor light mixing module of the present invention are not limited to the aforesaid embodiment. For example, please refer to FIG. 5, which is a side view of a multicolor light mixing module 100 according to another embodiment of the present invention. Components both mentioned in this embodiment and the aforesaid embodiment represent components with similar structures or functions, and the related description could be reasoned by analogy according to the aforesaid embodiment and omitted herein. In this embodiment, the multicolor light mixing module 100 could include the laser source set 12, the collimator lens 14, a reflective unit 102, the reflective diffusing member 18, and a lens array 104. The reflective unit 102 could include the reflective sheet 32 and a transmissive and reflective sheet 106, and the lens array 104 is disposed corresponding to the first lens portion 28 and the second lens portion 30.

Figure 5:
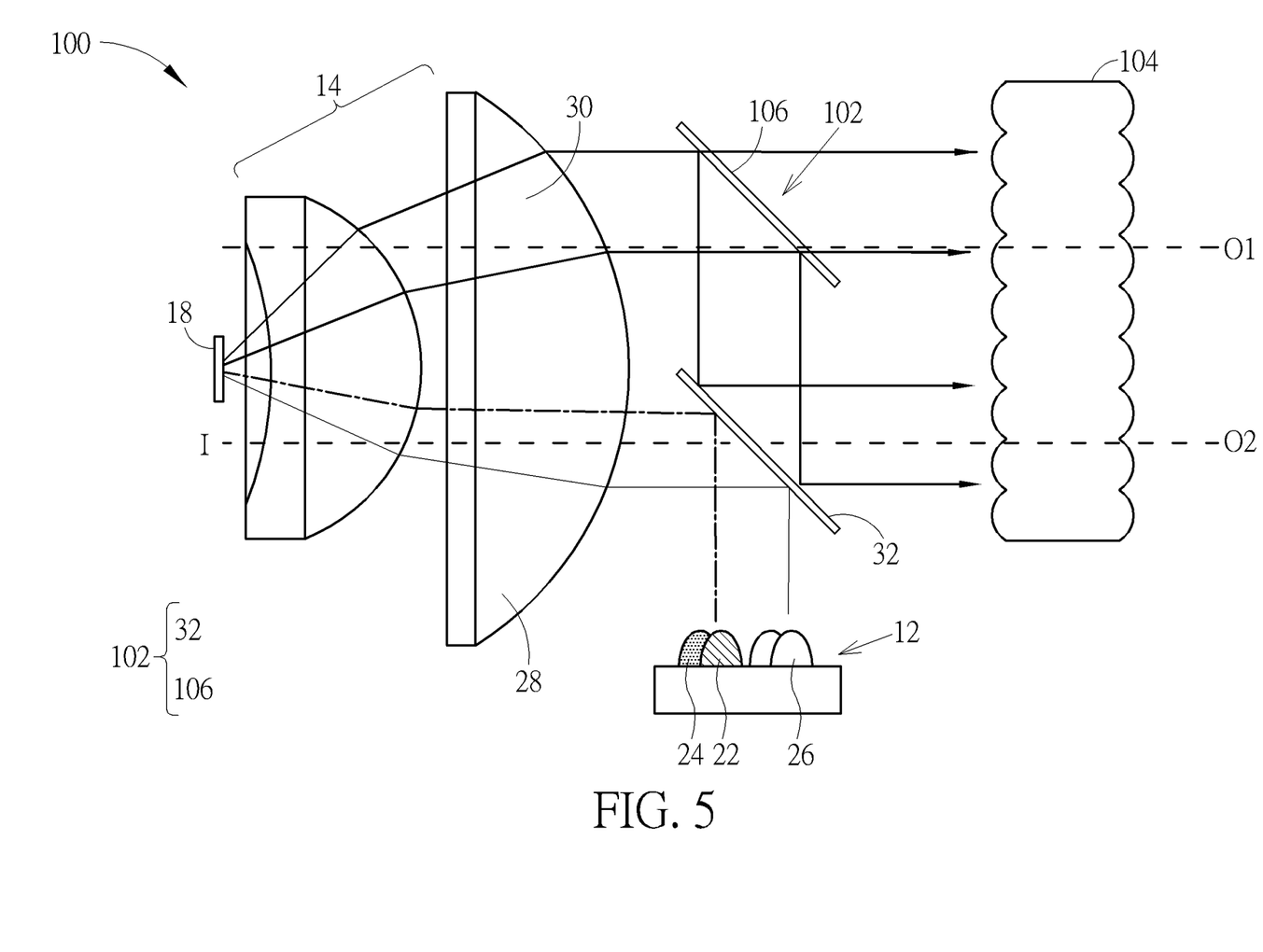
FIG. 5 is a side view of a multicolor light mixing module according to another embodiment of the present invention

The transmissive and reflective sheet 106 is obliquely disposed on the first light-exit axis O1 and corresponds to the reflective sheet 32 (preferably, an oblique angle of the transmissive and reflective sheet 106 relative to the first light-exit axis O1 is equal to 45°, but not limited thereto), to allow the first color light L1, the second color light L2, and the third color light L3 transmitted from the second lens portion 30 along the first light-exit axis O1 to pass therethrough partially (preferably at a ratio of 50%, but not limited thereto) to the lens array 104. The transmissive and reflective sheet 106 also reflects the first color light L1, the second color light L2, and the third color light L3 partially (preferably at a ratio of 50%, but not limited thereto) to the reflective sheet 32, so that the first color light L1, the second color light L2, and the third color light L3 can be reflected from the reflective sheet 32 to the lens array 104 along a second light-exit axis O2.

In such a manner, via the configuration in which the lens array 104 simultaneously corresponds to the first lens portion 28 and the second lens portion 30 and the design in which the transmissive and reflective sheet 106 is utilized to guide the first color light L1, the second color light L2, and the third color light L3 to the lens array 104 along the different light-exit axes (e.g., the first light-exit axis O1 and the second light-exit axis O2 as shown in FIG. 5), the present invention can expand the incident range of the first color light L1, the second color light L2, and the third color light L3 on the lens array 104 for enhancing the light mixing effect of the multicolor light mixing module 100, so as to further improving the image projection quality and color uniformity of the laser projection apparatus.

Figure 6:
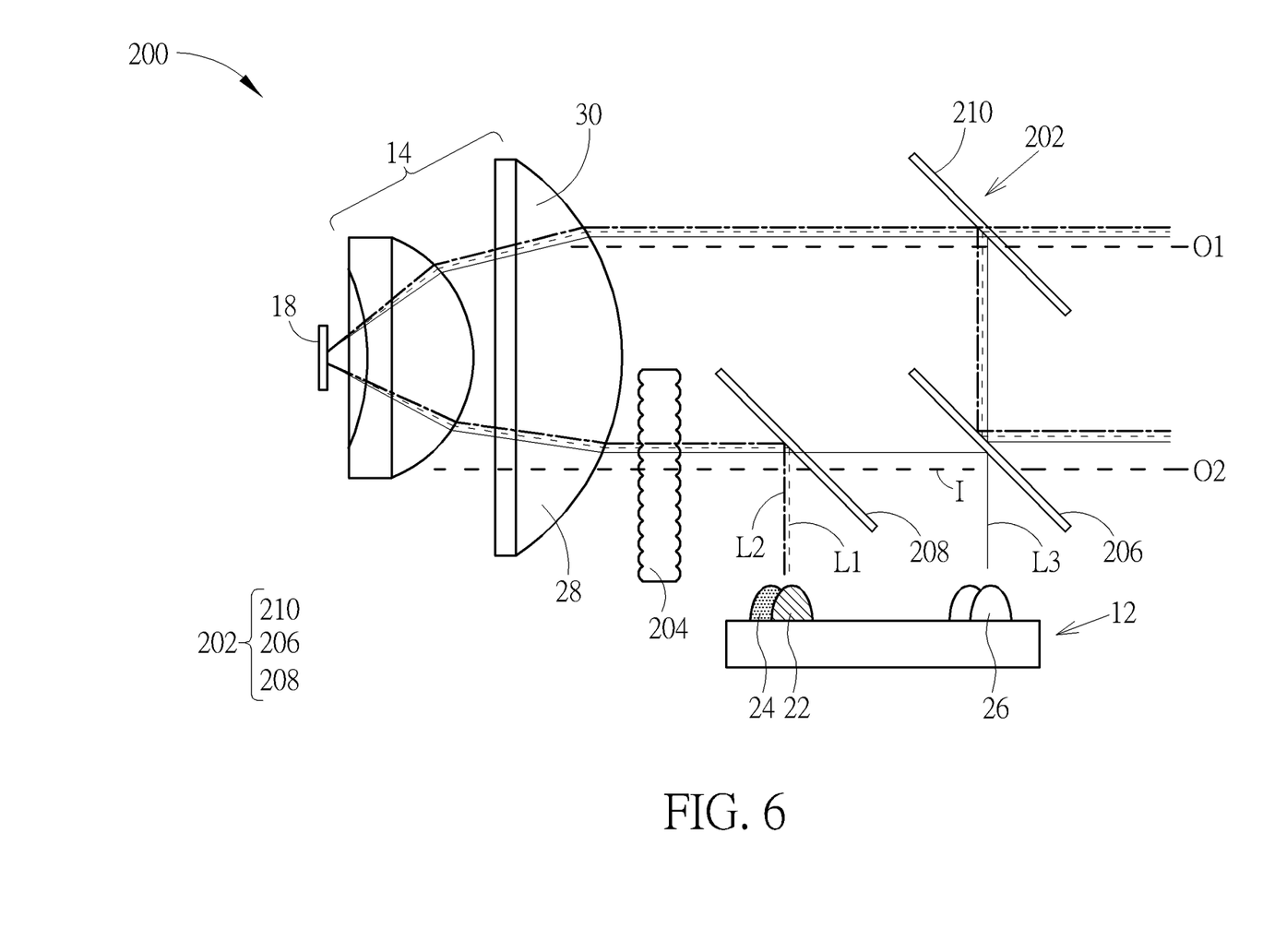
FIG. 6 is a side view of a multicolor light mixing module according to another embodiment of the present invention.

Furthermore, please refer to FIG. 6, which is a side view of a multicolor light mixing module 200 according to another embodiment of the present invention. Components both mentioned in this embodiment and the aforesaid embodiments represent components with similar structures or functions, and the related description could be reasoned by analogy according to the aforesaid embodiments and omitted herein. In this embodiment, the multicolor light mixing module 200 could include the laser source set 12, the collimator lens 14, a reflective unit 202, the reflective diffusing member 18, and a lens array 204. The reflective unit 202 could include a reflective sheet 206, a dichroic sheet 208, and a transmissive and reflective sheet 210, and the lens array 204 is disposed between the first lens portion 28 and the dichroic sheet 208.

The reflective sheet 206 is obliquely disposed on the light-entrance axis I and opposite to the plurality of third lighting units 26 (preferably, an oblique angle of the reflective sheet 206 relative to the light-entrance axis I is equal to 45°, but not limited thereto) for reflecting the third color light L3 to travel along the light-entrance axis I.

The dichroic sheet 208 is obliquely disposed on the light-entrance axis I (preferably, an oblique angle of the dichroic sheet 208 relative to the light-entrance axis I is equal to 45°, but not limited thereto) and opposite to the first lighting unit 22 and the second lighting unit 24 for reflecting the first color light L1 and the second color light L2 to travel along the light-entrance axis I and allowing the third color light L3 to pass therethrough such that the first color light L1, the second color light L2, and the third color light L3 are mixed along the light-entrance axis I and then pass through the lens array 204 and the first lens portion 28 sequentially for generating the effect that the mixed laser beam can be incident to the reflective diffusing member 18.

The transmissive and reflective sheet 210 is obliquely disposed on the first light-exit axis O1 (preferably, an oblique angle of the transmissive and reflective sheet 210 relative to the first light-exit axis O1 is equal to 45°, but not limited thereto) and corresponds to the reflective sheet 206. The transmissive and reflective sheet 210 allows partial transmission (preferably at a ratio of 50%, but not limited thereto) of the first color light L1, the second color light L2, and the third color light L3 transmitted from the second lens portion 30 along the first light-exit axis O1. The transmissive and reflective sheet 210 also allows partial reflection (preferably at a ratio of 50%, but not limited thereto) of the first color light L1, the second color light L2, and the third color light L3 to the reflective sheet 32, so that the first color light L1, the second color light L2, and the third color light L3 can be reflected by the reflective sheet 32 to travel along the second light-exit axis O2.

In such a manner, via the design in which the reflective sheet 206, the dichroic sheet 208 and the lens array 204 are utilized to mix the first color light L1, the second color light L2, and the third color light L3 and the design in which the transmissive and reflective sheet 210 is utilized to guide the first color light L1, the second color light L2, and the third color light L3 to travel along the different light-exit axes (e.g., the first light-exit axis O1 and the second light-exit axis O2 as shown in FIG. 6), the present invention can guide the mixed beam to the reflective diffusing member 18 for enhancing the despeckle effect of the reflective diffusing member 18 and provide the despeckle laser beam with multicolor light distributed in proper proportions on the different light-exit axes, so as to further improving the image projection quality and color uniformity of the laser projection apparatus.

To be noted, the third lighting unit mentioned in the aforesaid embodiments could be an omissible optical component. In brief, in another embodiment that the third lighting unit is omitted, the multicolor light mixing module of the present invention can utilize the reflective unit to reflect the first color light and the second color light, utilize the reflective diffusing member to diffuse and homogenize the first color light and the second color light, and utilize the lens array to mix the first color light and the second color light, so as to provide the despeckle laser beam with multicolor light (e.g., blue and green lights) distributed in proper proportions on the light-exit axis. As for the other related description for this embodiment, it could be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multicolor laser source comprising:
   a laser source set comprising a plurality of first lighting units and a plurality of second lighting units arranged sequentially, the plurality of first lighting units emitting a first color light, and the plurality of second lighting units emitting a second color light;
   at least one collimator lens disposed on a light-entrance axis and having a first lens portion and a second lens portion;

a reflective unit obliquely disposed on the light-entrance axis and opposite to the plurality of first lighting units and the plurality of second lighting units for reflecting the first color light and the second color light to the first lens portion along the light-entrance axis;

a reflective diffusing member disposed at a side of the at least one collimator lens to homogenize the first color light and the second color light transmitted from the first lens portion and reflect the first color light and the second color light to the second lens portion for guiding the first color light and the second color light to travel along a first light-exit axis; and a lens array disposed corresponding to at least one of the first lens portion and the second lens portion for mixing the first color light and the second color light.

2. The multicolor laser source of claim 1, wherein the laser source set further comprises a plurality of third lighting units arranged sequentially, the plurality of third lighting units is adjacent to the plurality of first lighting units and the plurality of second lighting units and emits a third color light, the reflective unit comprises a reflective sheet, a dichroic sheet, and a transmissive and reflective sheet, the lens array is disposed between the first lens portion and the dichroic sheet, the reflective sheet is obliquely disposed on the light-entrance axis and opposite to the plurality of third lighting units for reflecting the third color light to travel along the light-entrance axis, the dichroic sheet is obliquely disposed on the light-entrance axis and opposite to the plurality of first lighting units and the plurality of second lighting units for reflecting the first color light and the second color light and allowing the third color light to pass therethrough such that the first color light, the second color light, and the third color light are mixed along the light-entrance axis and then pass through the lens array and the first lens portion sequentially to be incident to the reflective diffusing member, the reflective diffusing member homogenizes the first color light, the second color light, and the third color light and reflects the first color, the second color light, and the third color light to the second lens portion, and the transmissive and reflective sheet is obliquely disposed on the first light-exit axis and corresponds to the reflective sheet to allow partial transmission of the first color light, the second color light, and the third color light transmitted from the second lens portion along the first light-exit axis and allow partial reflection of the first color light, the second color light, and the third color light to the reflective sheet to guide the first color light, the second color light, and the third color light to travel along a second light-exit axis.

3. The multicolor laser source of claim 2, wherein the first color light is a green light, the second color light is a blue light, and the third color light is a red light.

4. The multicolor laser source of claim 2, wherein the transmissive and reflective member allows the first color light, the second color light, and the third color light to pass therethrough partially at a ratio of 50% and reflects the first color light, the second color light, and the third color light partially at a ratio of 50%.

5. The multicolor laser source of claim 1, wherein the reflective diffusing member is movably disposed on the side of the at least one collimator lens.

6. The multicolor laser source of claim 5, wherein the reflective diffusing member moves reciprocally relative to the at least one collimator lens, to allow the first color light and the second color light to pass through the first lens portion to be simultaneously incident to the first haze area and the second haze area moving relative to the at least one collimator lens.

7. The multicolor laser source of claim 5, wherein the reflective diffusing member is a diffusing wheel to rotate relative to the at least one collimator lens, to allow the first color light and the second color light to pass through the first lens portion to be simultaneously incident to the first haze area and the second haze area rotating relative to the at least one collimator lens, the first haze area is formed on one of an inner ring portion and an outer ring portion of the diffusing wheel, and the second haze area is formed on another of the inner ring portion and the outer ring portion of the diffusing wheel.

8. The multicolor laser source of claim 1, wherein the reflective diffusing member comprises a reflective sheet and a haze diffusing layer formed on the reflective sheet by machining or attached or coated on the reflective sheet, to allow the first color light and the second color light to pass through the second lens portion and the first lens portion via homogenization and reflection of the reflective diffusing member.

9. The multicolor laser source of claim 8, wherein the reflective sheet is a metal plate or a reflective mirror.

10. The multicolor laser source of claim 8, wherein a haze of the haze diffusing layer is greater than 1.5.

11. The multicolor laser source of claim 8, wherein the haze diffusing layer comprises a first haze area and a second haze area adjacent to each other, the first haze area corresponds to the first lens portion, the second haze area corresponds to the second lens portion, a haze of the first haze area is different from a haze of the second haze area, and the first color light and the second color light are simultaneously incident to the first haze area and the second haze area via the first lens portion.

12. The multicolor laser source of claim 11, wherein the haze of the first haze area is higher than the haze of the second haze area.

13. The multicolor laser source of claim 1, wherein the reflective unit comprises a reflective sheet obliquely disposed on the light-entrance axis for reflecting the first color light and the second color light to the first lens portion, and the lens array is disposed corresponding to the second lens portion to mix the first color light and the second color light transmitted from the second lens portion along the first light-exit axis.

14. The multicolor laser source of claim 2, wherein the laser source set further comprises a plurality of third lighting units arranged sequentially, the plurality of third lighting units is adjacent to the plurality of first lighting units and the plurality of second lighting units and emits a third color light, the reflective sheet reflects the third color light to the reflective diffusing member through the first lens portion, the reflective diffusing member homogenizes the first color light, the second color light, and the third color light and reflects the first color, the second color light, and the third color light to the second lens portion, and the lens array mixes the first color light, the second color light, and the third color light transmitted from the second lens portion along the first light-exit axis.

15. The multicolor laser source of claim 1, wherein the first color light is a green light, the second color light is a blue light, and the third color light is a red light.

16. The multicolor laser source of claim 1, wherein the lens array is disposed corresponding to the first lens portion and the second lens portion, the reflective unit comprises a reflective sheet and a transmissive and reflective sheet, the reflective sheet is obliquely disposed on the light-entrance axis for reflecting the first color light and the second color light to the first lens portion, and the transmissive and reflective sheet is obliquely disposed on the first light-exit axis and corresponds to the reflective sheet to allow partial transmission of the first color light and the second color light transmitted from the second lens portion along the first light-exit axis to the lens array and allow partial reflection of the first color light and the second color light to the reflective sheet for reflecting the first color light and the second color light to the lens array along a second light-exit axis via the reflective sheet.

17. The multicolor laser source of claim 16, wherein the laser source set further comprises a plurality of third lighting units arranged sequentially, the plurality of third lighting units is adjacent to the plurality of first lighting units and the plurality of second lighting units and emits a third color light, the reflective sheet reflects the third color light to the reflective diffusing member through the first lens portion, the reflective diffusing member homogenizes the first color light, the second color light, and the third color light and reflects the first color, the second color light, and the third color light to the second lens portion, and the transmissive and reflective sheet allows partial transmission of the third color light transmitted from the second lens portion along the first light-exit axis to the lens array and allows partial reflection of the third color light to the reflective sheet, so as to make the lens array mix the first color light, the second color light, and the third color light travelling along the first light-exit axis and the second light-exit axis.

18. The multicolor laser source of claim 17, wherein the first color light is a green light, the second color light is a blue light, and the third color light is a red light.

19. The multicolor laser source of claim 17, wherein the transmissive and reflective member allows the first color light, the second color light, and the third color light to pass therethrough partially at a ratio of 50% and reflects the first color light, the second color light, and the third color light partially at a ratio of 50%.

* * * * *